March 17, 1942.　　　O. F. LEWIS　　　2,276,730
COAL CUTTING MACHINE
Filed March 13, 1940　　　5 Sheets-Sheet 1

OSWALD FLOYD LEWIS
INVENTOR

Myron B. Stevens
ATTORNEY

March 17, 1942. O. F. LEWIS 2,276,730
COAL CUTTING MACHINE
Filed March 13, 1940 5 Sheets-Sheet 2

OSWALD FLOYD LEWIS
INVENTOR
Myron B. Stevens
HIS ATTORNEY

March 17, 1942.   O. F. LEWIS   2,276,730
COAL CUTTING MACHINE
Filed March 13, 1940   5 Sheets-Sheet 3

OSWALD FLOYD LEWIS
INVENTOR

Myron B. Stevens
HIS ATTORNEY

March 17, 1942. O. F. LEWIS 2,276,730
COAL CUTTING MACHINE
Filed March 13, 1940  5 Sheets-Sheet 5

OSWALD FLOYD LEWIS
INVENTOR

Myron L. Stevens
HIS ATTORNEY

Patented Mar. 17, 1942

2,276,730

UNITED STATES PATENT OFFICE 2,276,730

COAL CUTTING MACHINE

Oswald Floyd Lewis, near Sheffield, England, assignor of one-half to Newton, Chambers & Company Limited, near Sheffield, England, a corporation of Great Britain Application March 13, 1940, Serial No. 323,804
In Great Britain March 13, 1939

4 Claims. (Cl. 262—30)

This invention relates to coal-cutting or like machines or combined cutting and loading machines of the kind referred to in my earlier U. S. A. Patent No. 2,189,670 in which is described a coal cutting and like machine comprising a body portion containing driving mechanism for a cutter chain and haulage mechanism whereby the machine can be hauled along parallel to a coal face with the body portion moving in the open space made by a preceding cut, said body having rigidly projecting from one side, at right angles to the direction of haulage of the machine, an upright open frame of substantially rectangular shape on which a cutter chain having cutting picks on one side is guided and driven so as to cut out a core of coal enclosed by the jib frame as the machine is hauled along and the jib has a replaceable section in one side and opposite thereto it is supported on the machine by a telescopic structure, whereby the size of the jib can be altered.

The primary object of the present invention is to provide an improved machine of that kind, which is easier and more economcial to manufacture and which can readily be made to withstand the stresses set up in the telescopic structure supporting the jib, due to any appreciable resistance to the cutting action or movement of the free end of the jib, since any forces applied to the end of the jib remote from the machine set up larger moments of force at the telescopic structure.

A principal feature of a machine according to the present invention is that, instead of the rectangular or box sectioned telescopic structure as described in specification No. 2,189,670 there are provided parallel cylindrical columns which are slidable in substantially circular guides on the body of the machine to form an extensible structure for mounting the jib. The cylindrical columns and guides can be more easily machined and fitted than the rectangularly shaped arrangement of specification No. 2,189,670 and the columns can be spaced apart to withstand any tendency of the jib to be slewed around during the cutting operation.

Further objects of the invention are to provide clamping means for securing the telescopic structure at the desired extended or retracted position and an improved arrangement for firmly securing the jib to the body of the machine, while at the same time permitting easy removal of the jib or a swinging movement thereof from the normal position for cutting into an inoperative position parallel with the direction of travel of the whole machine.

A still further object is the provision of improved control gearing which enables the mobility and effectiveness of the machine to be greatly increased and reduces the periods during which the machine must be taken out of service for adjustment or repair.

The details of how these and other objects are achieved will be clear from the following detailed description with reference to the drawings.

A construction of machine according to the invention is illustrated by way of example in the accompanying drawings, in which.

Figure 1:
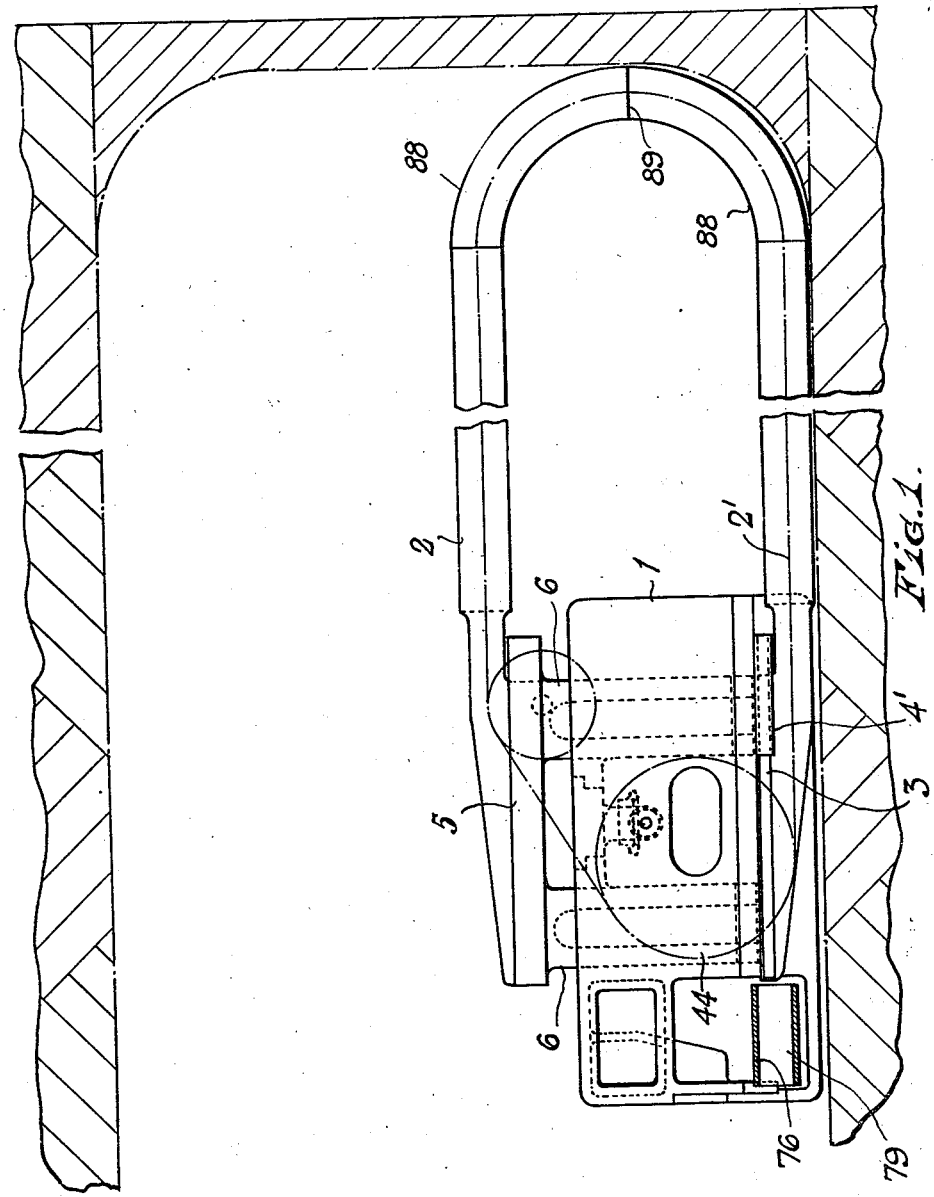
Fig. 1 is an elevation, partly in section, of a machine according to the invention.
Figure 2:
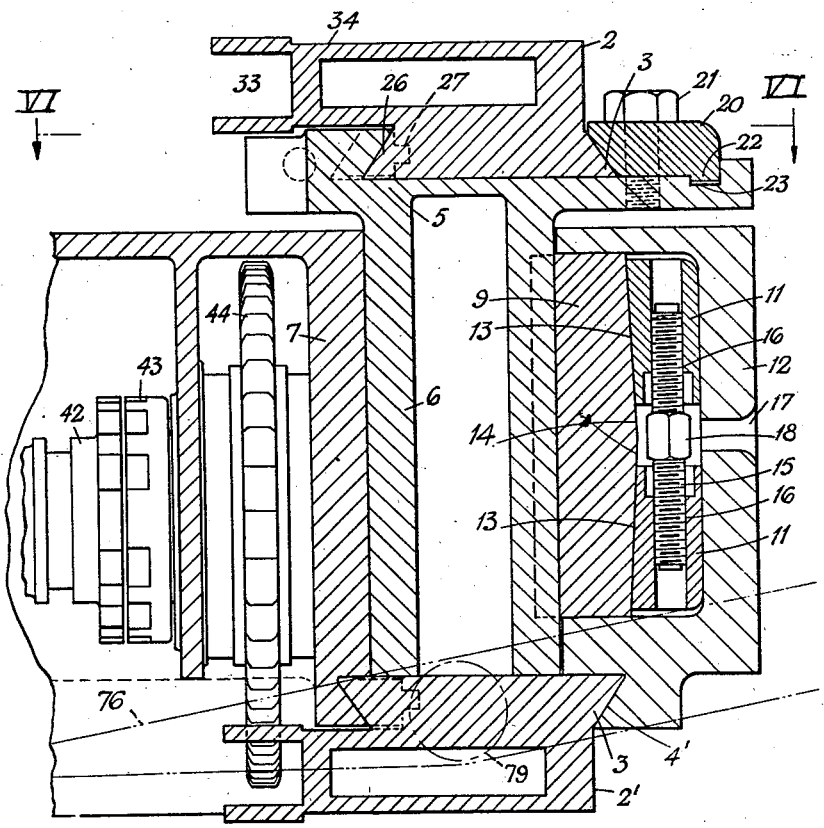
Fig. 2 is a sectional elevation taken on line II—II of Fig. 6.

In the machine shown, the upper and lower horizontal portions of the open jib or frame are indicated at 2, 2' in Figs. 1 and 2 and are made integral with short guides 3 which fit into undercut channels or grooves 4, 4' on the body 1 of the machine. The free ends of the jib members 2, 2' are connected together by curved members 88 which are separable at their meeting joint 89 to permit a suitable extension member to be inserted as desired. The lower groove 4' is integral with the machine body as will be clear from Fig. 2, but the top groove 4 is formed in the head 5 of a telescopic structure. In the present construction the telescopic or extensible structure consists of hollow cylindrical columns 6 slidable vertically in tubular guides 7 integral with the body 1 of the machine. At their upper ends the columns 6 are in one piece with the head 5. A jack or other suitable mechanism for extending or retracting the structure may be provided in the space 8 between the guides 7. The guides 7 are not completely tubular, but as shown each has an opening in the side through which projects a clamping member 9 located between parallel side walls 10 and each clamping member 9 can be forced against a column to clamp it between its guide 7 and its clamping member. Each member 9 has behind it a pair of wedges 11 (Fig. 2) which slide on the inner face of the rear wall 12 of the body 1 and have sloping faces 13 contacting with correspondingly sloping faces 14 on the rear of the member 9. The wedges 11 are moved by a double ended screw 15 engaging with internally screwed sockets 16 in the wedges. Each screw 15 is turned by inserting a spanner or wrench through the adjacent slot 17 to fit over the central squared portion 18 of the screw 15.

At the head of the telescopic structure, in order to allow for swinging movement of the jib out of operative position as described in specification No. 2,189,670 the side 19 of the top guide groove 4 which is integral with the head 5 is only a short length and the remaining portion 20 of the same side of the guide groove is made separate from the head 5 and is secured thereto by bolts 21 and is located in proper position by a tongue 22 (Fig. 2) fitting into a groove 23 in the head 5. The corresponding guide 3 projecting from the underside of the top horizontal portion 2 of the jib is made longer than the fixed part 19 of the guide groove and its ends are indicated at 24 and 25. The bottom guide and guide groove are similarly constructed. Thus, if the jib is slid in its guide channels until the end 24 of each integral guide 3 is clear of the fixed side 19 of the undercut channel and the section 20 is removed, the jib can be swung round out of its normal operative position and similarly if the jib is slid out until the edge 25 of the guide moves clear of the opposite end of the fixed side 19, the jib can be swung round. The jib can also be removed completely from the body 1. The separate portion 20 can also be used to clamp the jib in position by tightening the bolts 21 until the inclined undercut edge of this section 20 bears tightly on the sloping face of the guide 3, when this is under the part 20, and additional or alternative clamping means is provided by the wedge 26 which forms one side of the guide 3 and has a tongue and slot connection 27 with the main part of the guide 3. The wedge 26 can be forced into the correspondingly tapered portion 28 of the undercut guide channel by means of the bolt 29 which passes freely through a hole 30 in an ear 31, projecting from the guide 3, and screws into a tapped socket 32 in the head 5.

The parts above described can, if necessary be duplicated at the other end of the machine body so that the same jib can be used on either end. The clamping arrangements provided enable any movement of the jib relatively to the machine while cutting to be avoided.

Figure 3:
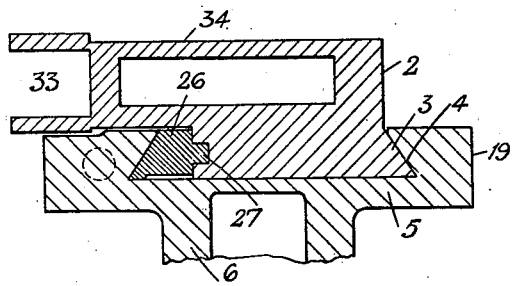
Fig. 3 is a fragmentary sectional view on line III—III of Fig. 6.

Figs. 2 and 3 also show the jib in section which in this case has a channel 33 for the cutter chain and a box-like web 34 supporting it, corresponding with the parts 5 and 6 referred to in specification No. 2,189,670.

Figure 4:
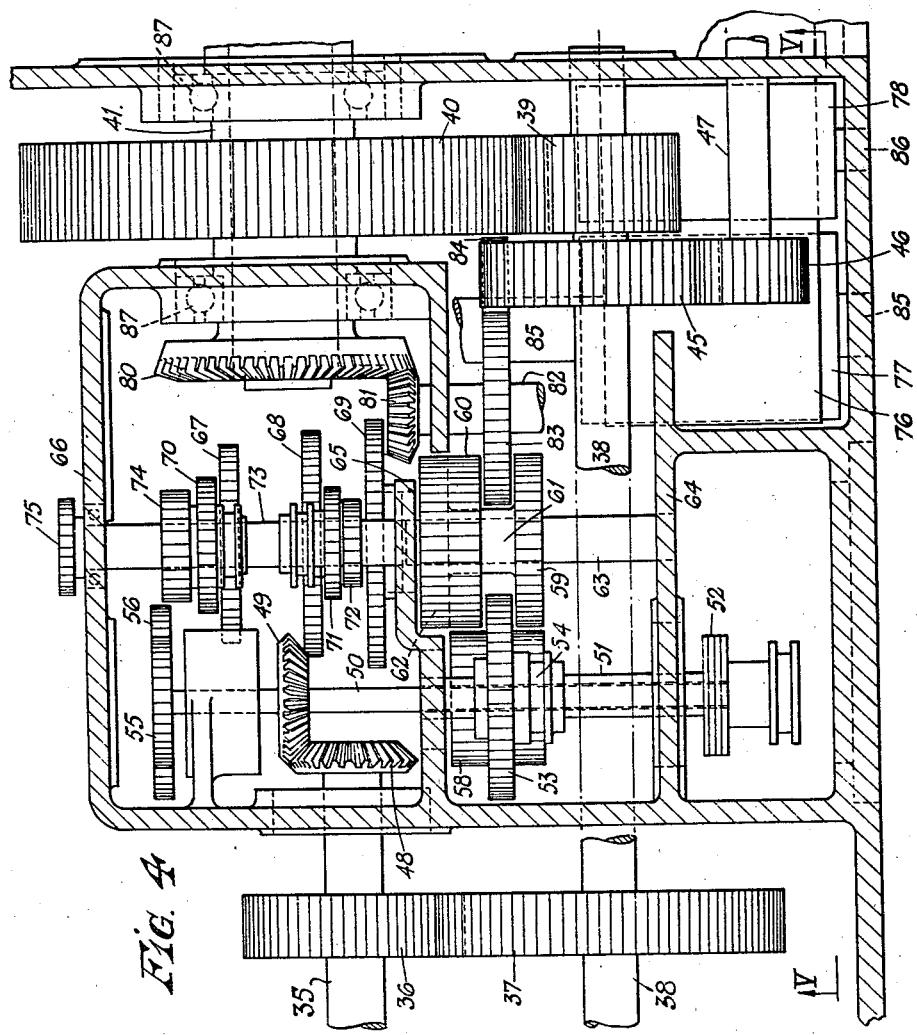
Fig. 4 is a sectional plan view (taken on line IV—IV of Fig. 5) of an adjacent part of the machine body showing the drive gearing.
Figure 5:
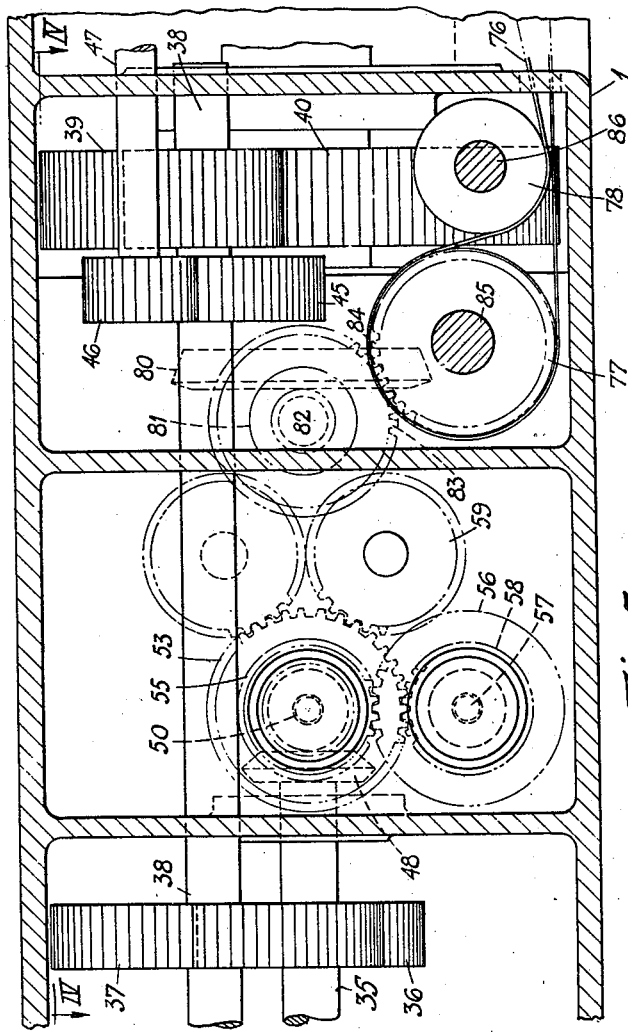
Fig. 5 is a sectional elevation taken on line V—V of Fig. 4.
Figure 6:
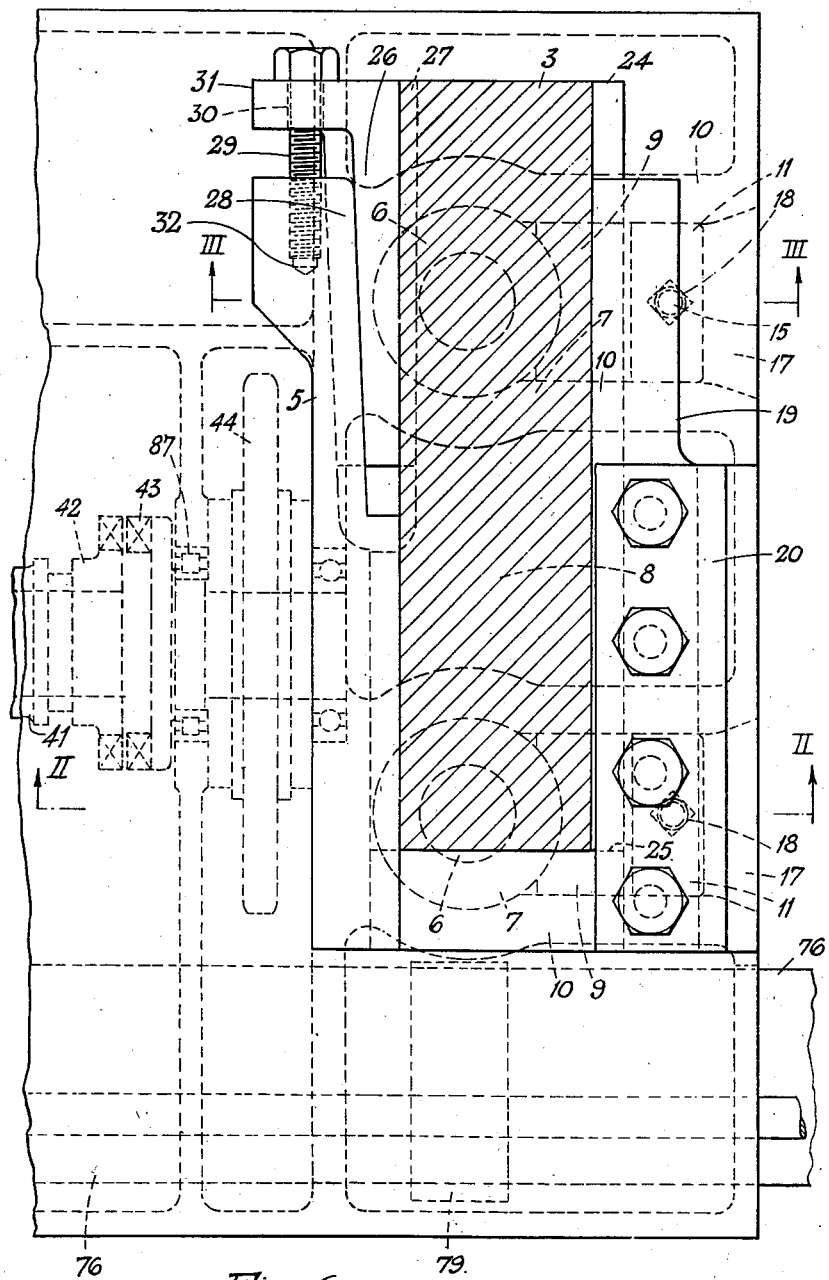
Fig. 6 is a sectional plan view of one end of the main body of the machine, the section being taken on the line VI—VI of Fig. 2.

Referring now to Figs. 4 and 5, the gearing through which the cutter chain sprocket is driven and the haulage movements are obtained is similar, in part, to that described in specification No. 2,189,670 and in the present construction the driving shaft 35, which is coupled to an electric or compressed air motor (not shown), has thereon a gear 36 meshing with a gear 37 on the longitudinal shaft 38 which also has keyed to it a gear 39 driving the gear 40 secured on the shaft 41 which carries the sliding element 42 of a dog-clutch (Figs. 2 and 6). The other half 43 of the dog-clutch is secured on the spindle of the cutter-chain driving sprocket indicated at 44. The shaft 38 also has secured on it a gear 45 which drives a smaller gear 46 on the end of another longitudinal shaft 47 which projects at the end of the machine and can be coupled to the operating mechanism of a loader of any convenient type and construction. By means of the dog-clutch 42, 43, the cutter chain can be driven or not, as desired, while the main drive and the loader-drive shaft 47 are kept running steadily.

The main driving shaft 35 also has secured on it a bevel gear 48 meshing with a bevel gear 49 on a transverse shaft 50 which has on it a sleeve 51 which can be coupled to the shaft 50 through a friction clutch 52 having one half on the outer end of the sleeve 51 and the other half on the outer end of shaft 50. The sleeve 51 also has splined on it a slidable gear 53 which can be moved by a forked lever or other means (not shown) engaging with the annular groove in the central boss 54 of the gear 53. On the rear end of shaft 50 is secured a spur gear 55 meshing with a larger spur gear 56 on the end of a second transverse shaft 57 (Fig. 5) below and parallel with the shaft 50. This lower transverse shaft 57 has on its forward end a sleeve carrying a wide gear 58 so that the slidable gear 53 is constantly in mesh therewith and the sleeve on the lower shaft 57 can be coupled to the lower shaft by a second clutch similar to the clutch 52 and positioned underneath the clutch 52 and therefore not visible in Fig. 4. By engaging the upper clutch 52 the gear 53 is coupled directly to shaft 50, and by engaging the clutch on the lower shaft 57 (with the upper clutch released) the gear 53 is driven indirectly from shaft 50 through gears 55 and 56 and shaft 57 and the wide gear 58. Suitable interlocking arrangements are provided in the clutch operating mechanisms (not shown) to prevent both clutches being engaged together. The use of two clutches ensures that the safety factor is always adequate to the conflicting requirements of higher speed and therefore greater power for flitting the machine back along the working face, and lower speed and less power for haulage while cutting.

Change speed and reversing gearing is provided for enabling the appropriate haulage speed to be selected and the arrangement is as follows. The slidable gear 53 can be moved into mesh either with a gear 59 or with a wider gear 60. The gear 59 is integral with a sleeve 61 and with another gear 62 below the wider gear 60 and meshing with it. Thus, when gear 53 is meshed with gear 59, the gear 60 is driven in one direction through gear 62. The gear 60 is driven in the opposite direction when it is in mesh with the gear 53. The sleeve 61 and integral gears 59 and 62 rotate together on a fixed transverse spindle 63 extending from the support 64 to the bracket 65. In alignment with the fixed spindle 63 is a rotatable layshaft mounted at its forward end in a bearing in the bracket 65 and at its rear end in the wall 66 of the gear casing. The layshaft has secured on it the gears 67, 68 and 69 which can be engaged respectively by the sliding gears 70, 71 and 72 on an upper transverse shaft 73 above and parallel with the layshaft. The wide gear 60 is secured to the front end of this upper shaft 73 which projects beyond the bracket 65. The gears 74 and 75 on the upper transverse shaft 73 and on the layshaft, respectively, engage with other gears (not shown) for driving the haulage chain sprockets.

In order to carry away any cuttings which may be brought around by the cutter chain a small conveyor belt 76 (Fig. 5) is provided at the bottom of the machine inside the front of the body 1. This conveyor runs over a drum 77 and under a guide roller 78 and then runs in an upwardly inclined direction, over another guide roller 79 (Fig. 2) and out through an opening in the end of the body and round an external drum (not shown) so that the cuttings are deposited on the loader or longwall conveyor and the return run of the conveyor belt is returned into the body 1, under the guide roller 79, to the drum 77 by which the conveyor is driven. Strictly, the upwardly sloping part of the conveyor belt would not be seen in the section shown in Fig. 2, but this portion of the belt is shown in chain-dotted lines in Fig. 2 to make its position clear. The drum 77 is driven from the shaft 41 through a bevel gear 80 thereon meshing with a smaller bevel gear 81 on a shaft 82 which also has on it a spur gear 83 which partly projects between the gears 59 and 60 but does not mesh with them, and the spur gear 83 meshes with and drives another spur gear 84 on the shaft 85 of the drum 77. The shaft 85 and the spindle 86 of the guide roller 78 are mounted at one end on the wall of the body 1 and at their other ends in suitable brackets or supports (not shown).

In some cases ball or roller bearings are indicated as at 87 and it will be understood that suitable bearings for all the rotatable shafts and spindles are provided.

In an actual machine, the body thereof will, of course, be provided with suitable openings closed by removable cover plates to enable the internal gearing and other parts to be fitted into place and inspected from time to time.

What I claim as my invention and desire to secure by Letters Patent is:

1. A coal cutting machine comprising a body and a vertical frame jib projecting laterally from said body, spaced apart vertical tubular guides in said body, vertical cylindrical columns slidable in said tubular guides, a head integral with the upper ends of said columns, clamping means projecting into said guides to bear on said columns, means for adjusting said clamping means to clamp the columns in raised positions, and transverse grooves in said head and said body to receive horizontal portions of the jib frame.

2. The structure of claim 1 with means for clamping the horizontal portions of the jib frame in their grooves.

3. The structure of claim 1 having a removable portion at one side of the groove in said head.

4. A coal cutting machine comprising a body having at one end thereof a pair of parallel tubular guides spaced apart on a line transversely of said body, an opening at one side of each tubular guide, a pair of vertical cylindrical columns slidable in said guides and depending from a common head, a block projecting through each of the openings in said guides and bearing on the column slidable therein, wedging means for forcing said blocks against said columns to clamp them at a selected height, undercut horizontal grooves at the bottom of said body and in said head, said grooves receiving co-operating portions of the ends of an open jib frame, and means for securing the ends of said jib in said grooves.

OSWALD FLOYD LEWIS.